United States Patent
Wheeler et al.

(10) Patent No.: US 7,653,263 B2
(45) Date of Patent: Jan. 26, 2010

(54) METHOD AND SYSTEM FOR VOLUMETRIC COMPARATIVE IMAGE ANALYSIS AND DIAGNOSIS

(75) Inventors: Frederick Wilson Wheeler, Niskayuna, NY (US); Bernhard Erich Hermann Claus, Niskayuna, NY (US); John Patrick Kaufhold, Arlington, VA (US); Jeffrey Wayne Eberhard, Albany, NY (US); Mark Lewis Grabb, Burnt Hills, NY (US); Cynthia Elizabeth Landberg, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 549 days.

(21) Appl. No.: 11/172,655

(22) Filed: Jun. 30, 2005

(65) Prior Publication Data
US 2007/0003117 A1    Jan. 4, 2007

(51) Int. Cl.
*G06K 9/52* (2006.01)
*G06K 9/00* (2006.01)

(52) U.S. Cl. ................................... 382/294

(58) Field of Classification Search ............... 399/301, 399/372, 394, 294, 154, 128, 130–132, 141–152; 430/21, FOR. 102; 382/294; 348/263, 745; 704/224, 234, E17.01; 600/407
See application file for complete search history.

(56) References Cited

U.S. PATENT DOCUMENTS

| | | | | |
|---|---|---|---|---|
| 5,359,513 A | * | 10/1994 | Kano et al. | 382/128 |
| 5,531,520 A | * | 7/1996 | Grimson et al. | 382/131 |
| 5,749,364 A | * | 5/1998 | Sliwa et al. | 600/438 |
| 5,937,083 A | * | 8/1999 | Ostuni | 382/131 |
| 6,363,163 B1 | * | 3/2002 | Xu et al. | 382/130 |
| 6,484,047 B1 | | 11/2002 | Vilsmeier | 600/407 |
| 6,611,615 B1 | * | 8/2003 | Christensen | 382/130 |
| 2004/0005027 A1 | * | 1/2004 | Nafstadius | 378/65 |
| 2004/0010190 A1 | * | 1/2004 | Shahidi | 600/407 |
| 2004/0015072 A1 | * | 1/2004 | Pelletier et al. | 600/410 |
| 2004/0017935 A1 | * | 1/2004 | Avinash et al. | 382/131 |
| 2004/0076319 A1 | * | 4/2004 | Fauver et al. | 382/133 |

FOREIGN PATENT DOCUMENTS

WO    WO/2005/005924    *    1/2005

OTHER PUBLICATIONS

Shashidhar et al., Detection of Small Tumors in the Breast:Combining tomography with digital Subtraction, RC IEEE-EMBS & 14, BMESI-1995, pp. 1-2.*

* cited by examiner

*Primary Examiner*—Sherali Ishrat
(74) *Attorney, Agent, or Firm*—Jason K. Klindtworth (57) ABSTRACT

A technique is provided for comparative image analysis and/or change detection using computer assisted detection and/or diagnosis (CAD) algorithms. The technique includes registering two or more images, comparing the images with one another to generate a change map, and detecting anomalies in the images based on the change map.

11 Claims, 5 Drawing Sheets

METHOD AND SYSTEM FOR VOLUMETRIC COMPARATIVE IMAGE ANALYSIS AND DIAGNOSIS

BACKGROUND

The invention relates generally to comparative image analysis and in particular to a method for automating comparison of images for analysis and diagnosis using computer assisted detection and/or diagnosis (CAD) algorithms.

Various technical fields engage in some form of image evaluation and analysis for monitoring, analysis, or diagnostic purposes. For example, medical imaging technologies produce various types of diagnostic images which a doctor or radiologist may review for the presence of identifiable features of diagnostic significance, such as lesions, calcifications, nodules, and so forth. Similarly, in other fields, other features may be of interest. For example, industrial quality control applications may review non-invasively acquired images for the presence of internal or external cracks, fractures, or fissures. Similarly, non-destructive imaging of package and baggage contents, analysis of satellite image data and others may be reviewed to identify and classify recognizable features.

For example, in conventional mammography a radiologist examines two-dimensional (2D) X-ray images of the breast for signs of disease. It is common practice for the radiologist to compare the latest 2D X-ray images with a patient's previous 2D X-ray images, possibly going back several years over several exams, to look for signs of change that may indicate disease. Such a comparison of images acquired of the same region but at different times is known as a longitudinal comparison. It is also common practice to compare images of symmetrically related regions acquired at the same time, such as images of the right and left breasts acquired during the same mammography examination, to look for asymmetries that may indicate disease. Such a comparison of images acquired at the same time of symmetrically related regions is known as a lateral comparison.

Such longitudinal and lateral comparisons, however, may be more complex, and therefore more difficult, where a comparison of three-dimensional (3D) tomographic images is desired. Furthermore, as computing power and imaging technology advance, such 3D imaging technologies and images become more prevalent. For example, in the context of medical imaging, limited angle tomography, e.g., tomosynthesis, X-ray spin, computed tomography (CT), ultrasound, positron emission tomography (PET), single positron emission computed tomography (SPECT), and magnetic resonance imaging (MRI) are all example of 3D imaging technologies that are used for screening and diagnostic purposes with increasing frequency. As a result, the difficulties in manually performing longitudinal and/or lateral comparisons are also increasingly common. Additionally, in some cases where a longitudinal comparison is desired the radiologist may be required to compare a current 3D tomographic image to a previously acquired 2D X-ray image. Comparison of such different types of images, i.e., 2D and 3D images, acquired using different imaging modalities may be difficult, imprecise, and time-consuming for a radiologist to perform manually.

It is therefore desirable to provide an efficient and improved detection or diagnosis method and system for automating the comparative analysis and/or change detection.

BRIEF DESCRIPTION

Briefly in accordance with one aspect of the technique, a method is provided for comparative image analysis. The method provides for registering two or more three-dimensional images, automatically generating a change map comprising differences between the two or more three-dimensional images, and automatically detecting anomalies in at least one of the two or more three-dimensional images based on the change map. Processor-based systems and computer programs that afford functionality of the type defined by this method may be provided by the present technique.

In accordance with another aspect of the technique, a method is provided for comparative image analysis. The method provides for normalizing one or more of a plurality of three-dimensional images, registering the plurality of three-dimensional images, and automatically comparing the plurality of three-dimensional images. Processor-based systems and computer programs that afford functionality of the type defined by this method may be provided by the present technique.

In accordance with a further aspect of the present technique, a method is provided for comparative image analysis. The method provides for registering two or more three-dimensional images to an atlas, establishing one or more respective registration transfer functions between the two or more three-dimensional images based on the registration of the two or more three-dimensional images to the atlas, and automatically comparing the two or more three-dimensional images. Processor-based systems and computer programs that afford functionality of the type defined by this method may be provided by the present technique.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques are generally directed to automating comparative image analysis and/or change detection, possibly in conjunction with computer assisted detection and/or diagnosis (CAD) algorithms. Such analysis techniques may be useful in a variety of imaging contexts, such as medical imaging, industrial inspection systems, nondestructive testing and others. Though the present discussion provides examples in a medical imaging context, one of ordinary skill in the art will readily apprehend that the application of these techniques in non-medical imaging contexts, such as for industrial imaging and analysis of satellite data is well within the scope of the present techniques.

Figure 1:
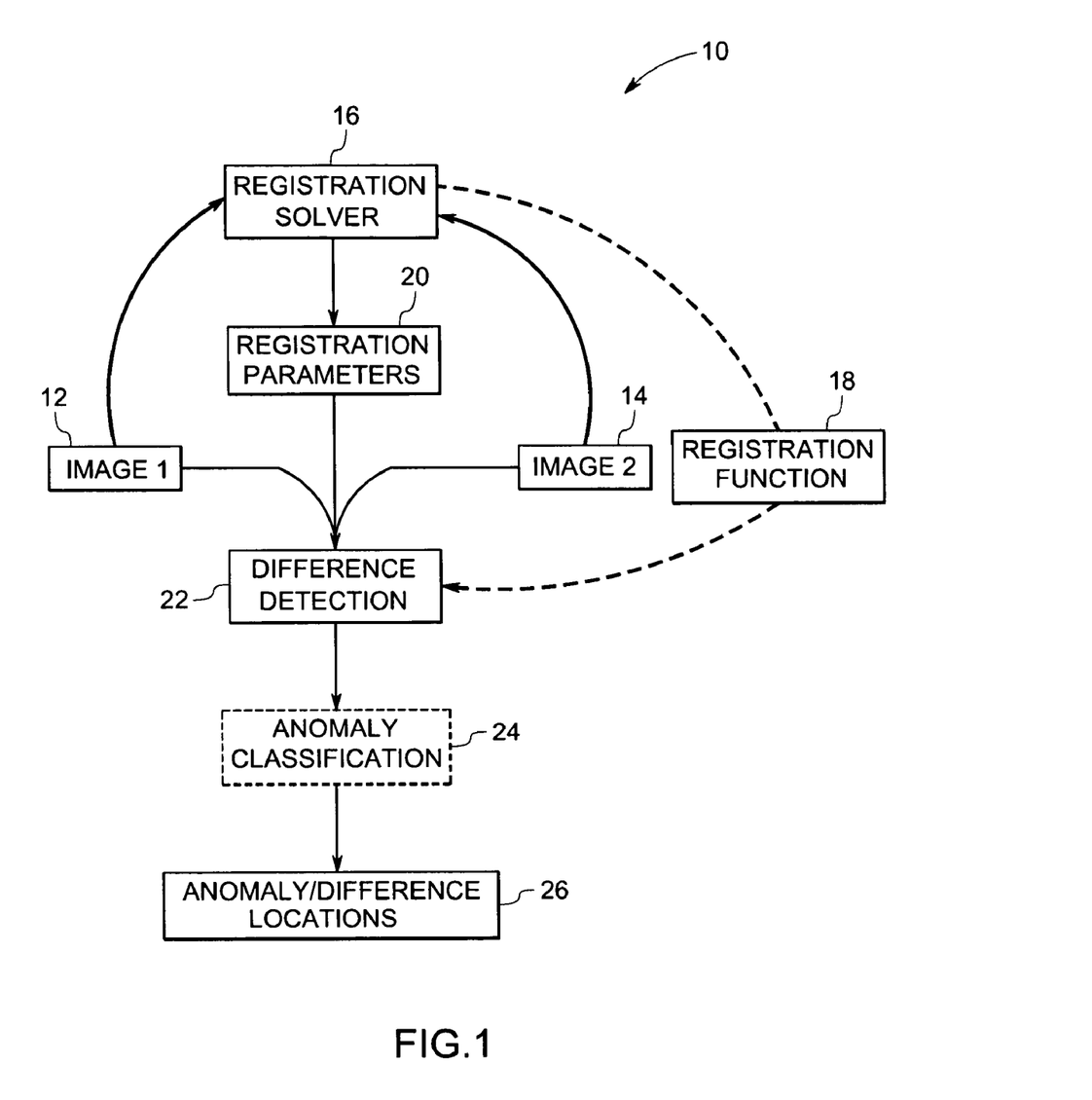
FIG. 1 depicts a schematic block diagram for comparative image analysis and/or change detection in accordance with aspects of the present technique.

Referring now to FIG. 1, a schematic block diagram 10 for comparative image analysis and/or change detection in accordance with aspects of the present technique is illustrated. As illustrated, two or more images such as a first image 12 and second image 14 may be provided to a registration solver 16 which may be implemented as hardware (such as an application specific integrated circuit (ASIC)), software, or a combination of hardware and software on an image analysis or acquisition system. As discussed herein, the first image 12 and second image 14 may be acquired by the same or different imaging modalities and/or with the same or different imaging protocols or geometries. Indeed, if a 2D imaging modality is used to acquire the first image 12 and a 3D imaging modality is used to acquire the second image 14, the first image 12 may be 2D while the second image 14 may be 3D. Furthermore, the first image 12 and the second image 14 may be acquired at the same or different times and/or may be of different, but symmetric, body parts. The first and the second images 12, 14 may be acquired via various imaging modalities that may include, but are not limited to, digital X-ray, tomosynthesis, computed tomography (CT), magnetic resonance imaging (MRI), ultrasound, positron emission tomography (PET), single photon emission computed tomography (SPECT), thermoacoustic imaging, optical imaging, nuclear spin tomography and nuclear medicine based imaging.

It should be noted that, some types of medical images, such as those acquired by CT or MR scanners are consistent enough that two images taken over time may have their pixel values compared directly. That is, a particular region of tissue, barring changes to the tissue, will appear in each volumetric image with roughly the same intensity levels, though there will be some difference due to noise. In such instances, there is typically a transfer function which may be referred to as a "tissue-intensity transfer function" from tissue type to voxel intensity in the volumetric image that is relatively constant. However, in other imaging modalities, such as in limited-angle X-ray tomosynthesis, for example, if different X-ray techniques are used for two scans, then the tissue-intensity transfer function is not constant. The X-ray technique may include factors such as the anode material, filter material and thickness, keV setting, and other settings, which can affect the spectrum of X-rays, and thus affect the tissue-intensity transfer function, if different during the acquisition of the image datasets. In practice, the X-ray technique employed may change from scan to scan for the same person, particularly if the images are acquired at different times or using different imaging equipment. The voxel intensity in the volumetric datasets may also depend on the specific reconstruction method used for forming the volumetric image from the acquired data, or may be different for different modalities, etc. Accounting for the difference in the tissue-intensity transfer function due to a change in X-ray technique may improve the accuracy of registration and change detection between the images. Hence, the images may be normalized as part of or prior to the registration process to account for intensity differences based on the acquisition parameters such as imaging modality and/or the imaging technique employed for acquiring an image. Alternatively, mapping between pixel values may be determined without knowledge of any acquisition technique by directly estimating the transfer function between pixel values. This is the case, for example, when mutual information based registration approaches are used. Similar approaches may be used, when, for example, multi-modality datasets are available. For example, a co-registered combined tomosynthesis and ultrasound dataset may be acquired, and be compared to a previously acquired 3D or 3D X-ray dataset. Here the information from both the X-ray and/or the ultrasound image may be used to achieve a registration for the temporal comparison.

The registration solver 16 registers the images with one another by establishing point correspondences between the images. The registration is performed so as to address differences in the acquisition parameters between different modalities. These parameters may be different pixel or voxel size, different image size and/or different orientation in acquired images. The process of registration, which is also referred to as image fusion, superimposition, matching or merging, maps each point in one image onto the corresponding point in each of the other images. In certain embodiments, registration may be accomplished by determining the parameters of a registration function 18 that maps a coordinate in one volumetric image to the coordinate in a different scan corresponding to the same physical location. The registration parameters 20 may be computed by registration solver 16 using correlation and/or feature location matching. The images may then be registered with each other via the registration function. Alternatively, a mechanical deformation model may be used for the registration. As will be appreciated by those skilled in the art, any registration method may be employed to register the images with one another before comparing the images for differences or changes. This includes fully automatic registration as well as computer assisted manual registration, or any registration approach using varying degrees of manual intervention. To register more than two images, the images may be registered in pairs. For example, if a first image and a second image are registered, and, separately, the second image and a third image are registered, then by the composition of the registrations functions, the first and third images are effectively registered. This concept extends to any number of images. Thus, using a pairwise registration algorithm, one can register any number of images. Additionally, registration algorithms that simultaneously register more than two images may also be employed by the present technique.

For example, in certain embodiments, registration may be based on landmark extraction. The registration of images may be accomplished by modeling the large-scale motion and local distortion of the anatomy. Parameters of the model that defines these motions are estimated. A search is then performed to find the parameter values that produce the best alignment of the images. The quality of this alignment may be based on a comparison of pixel values at all corresponding points in the original images. However, the images may also be processed before the registration takes place. This processing may be to correct for changes in the tissue-intensity transfer function, i.e., to normalize the images. This processing may also be for the purpose of extracting landmarks, such as edges, in the anatomy. In other embodiments, the registration may be "feature-based", e.g., based on information about shape and location of edges in the image, without a prior normalization step. In such an instance, the normalization, if performed, may occur after the registration step. The registration may also include a mechanical model that constrains the possible deformations of the imaged anatomy.

Further, the registration of the medical images may be carried out via an atlas. An atlas is a general mathematical model of a particular portion of the anatomy where each part of the anatomy may be labeled, and the intensity as observed by a particular imaging modality (CT, MR, etc.) for each point in the atlas is known. Atlases generally have parameters that morph the shape of the anatomy so that it transcends normal changes that occur in the anatomy of a person, and so it also transcends the various sizes and shapes of the anatomic parts that occur over some population of people. For example, an MR atlas of human heads would have parameters that control the ways various portions of the skull and brain change in each person over time, and would have parameters for the way the heads of different people differ. Further, the atlas may contain information regarding how each point in the head would appear under MR imaging, given the MR system settings. Each portion of the anatomy in the atlas may be labeled. Registration of multiple scans of the same person to the same atlas allows us to effectively register all of the volumetric images directly to each other.

Once the images are registered, the images 12, 14, and possibly other images in the series, are compared at step 22 to detect differences or regions that have changed via a computer aided change detection (CACD) algorithm. The comparison may be point-based or region-based. In a point-based comparison individual points from one image are matched to the corresponding physical points in the other images and some aspect of the images at those points are compared to determine differences. In region-based comparison, some aspect of the images in small regions around the points is compared. The shape/size of the regions may be data-driven, for example, by a segmentation of the data. Such region-based comparison may also incorporate anatomical factors or information (e.g., in the case of mammography, position of region relative to nipple, skin-line, pectoral muscle, etc.). The comparison of points or regions may be accomplished in several different ways. For example, the image pixel values may be compared or image pixel values after the images are filtered and/or normalized may be compared. Alternatively, texture measures, perhaps from wavelet or Gabor filter banks, of the local areas around the points may be compared. Other features or feature characteristics, such as segmented region characteristics after segmentation, computed from the local three-dimensional image regions may be compared. It should be noted that, computation of the texture measures, normalized pixel value and/or features or feature characteristics may be done prior to the comparison. In certain embodiments, comparison may additionally account for determining the tissue to fat conversion trend that occurs in the breast or other trends in physiological differences. Further, it should be noted that, a prior model of normal anatomical change may be applied to partially predict and account for normal tissue changes reflected in tissue (as reflected in their pixel values or spatial distributions) due to involution. For example, if a woman is near menopause, some glandular tissue in an earlier image might be expected to have changed to fat in a later image. In other words, changes which are expected to occur in the intervals between the separate image acquisitions may be accounted for so that unexpected changes are primarily detected.

Comparison of images may use, but is not limited to, measuring simple differences or differences with thresholding (small differences are assumed to be insignificant or noise), etc. The comparison may also include generating a probabilistic measure of change from image to image, for example, incorporating a level of confidence in the detected change. This confidence measure may also incorporate confidence estimates originating from the prior registration step, that is, if at some location the confidence in the result of the registration is low, then consequently the confidence in a detected change in this location would also be low. It should be noted that when more than two images are compared, the change may be detected as a large difference between any two images, or a deviation in any one image from a trend occurring over time in the images. Further, in certain embodiments, the registration and/or comparison of the images may take X-ray technique parameters, compressed breast thickness, imaging geometry, and other system and imaging parameters as well as other collected parameters describing the imaged anatomy into account. Alternatively, instead of comparing the images directly, 'feature maps' or 'feature intensity maps' may be compared, where the features may be robust or invariant relative to the X-ray technique employed. For example, in one embodiment, edge images may be compared. A strong edge response may indicate the presence of a calcification in mammography and by detecting and comparing strong edge responses 'new calcifications' may be identified. Similarly, comparison may be based on other features such as texture features. Additionally, in certain embodiments, images may be segmented and the segments may be labeled before comparison. For example, segmented volumes with regions labeled as fatty or fibroglandular tissue may be compared with each other.

It should be noted that, in certain embodiments, the image datasets may be compared in the projection domain (with or without a reprojection step) due to artifacts that are potentially significant factors in 3D images obtained through tomosynthesis reconstruction. In particular, since the artifacts are strongly linked to the acquisition geometry, and the acquisition geometry (relative to the imaged anatomy) between different acquisitions will typically be slightly different for each acquisition, comparison of tomosynthesis datasets may be dominated by artifacts, and not by actual differences in the imaged objects. Therefore, comparison/subtraction in the projection domain, where the artifacts are expected to have a smaller impact, may be useful.

Further, the points or regions that have changed and/or the degree to which they have changed may be provided as an output. Additionally, a post-processing step may be performed before the images are output, including, e.g., clustering of pixels/regions where the difference exceeds a certain threshold, shape evaluation and classification, etc. These regions of change may be viewed directly by a radiologist or used by other automatic processing systems. In certain embodiments a computer aided anomaly detection and/or diagnosis (CAD) system is provided which may use the output of the change or difference detection system as an input or factor in determining whether there is an indication of disease or in evaluating the severity of a disease. In such embodiments, the CAD system may detect suspicious and/or malignant structures in the anatomy based on the detected changes. For example, for each location in the most recent image data set, a CACD system may have a binary output, indicating whether change has taken place or not, or it may have a probabilistic output, indicating the probability that change has taken place. Regardless of its output type, this output is referred to as a "change map". This change map may then be fed to and used by a CAD system. The CAD system can use the change map as an additional weighting factor as it determines whether an anomaly is present or how significant the anomaly is.

Thus, the CAD system may analyze regions that have changes or differences to detect and classify one or more regions of interest at step 24. These regions of interest may represent anomalies or abnormal changes that may be an indication of a disease. In certain embodiments, CAD systems may also identify the type of anomaly and identify different types of normal tissue. For example, a change in breast tissue over time, or a left-right asymmetry found in this way may indicate disease, but also may be a normal or benign change. The one or more regions of interest may then be displayed along with their location 26.

Typically, a CAD system outputs hard decisions, such as yes/no or true/false. These are a list of locations in the image where the CAD system thinks there is an anomaly or region of interest, i.e., for a particular, region, location, or pixel a yes or no output may be provided to indicate the presence or absence of an anomaly. However, in certain embodiments, the CAD system may also output soft decisions, which are a longer list of places where an anomaly may exist, along with a probability or degree of confidence for each location. In one embodiment, hard decisions may be generated by thresholding the confidence levels on soft decisions. The soft decision output of the CAD system may also be a map of vectors of probabilities, with a probability given for each of the tissue classes the CAD system understands, which include anomalies and normal tissue. The CACD change map and the CAD soft decision output may be fed to a master CAD algorithm that decides and outputs the locations where significant changes that appear to be an anomaly have taken place. Thus, by combining the CACD and CAD system, the overall accuracy of anomaly detection improves.

In certain embodiments, change detection may be an integral part of the CAD algorithm. The local difference between datasets is just one of the features that the 'augmented CAD' algorithm evaluates. In this case, CAD looks at two or more datasets simultaneously instead of analyzing each dataset independently, thereby evaluating how "suspicious" any given location looks by itself, and how "suspicious" it is given the additional information about the local change between datasets. For instance, a master CAD system as described above may alter its sensitivities or other detection parameters based on the observed change map. Similarly, in certain embodiments, global change detection may be an integral part of the CAD algorithm. For example, some women who have (locally, or overall) dramatically increased or decreased breast density (proportion of fibroglandular breast tissue) in a later image, compared with an image taken earlier in time, may be at increased or decreased marginal risk of breast cancer. A woman's total percent or amount of glandular tissue and/or the change in those quantities may be taken into account in all scans to increase or decrease the sensitivities or other detection parameters in a CACD, CAD, or master CAD system. In this way, performance may be optimized for the patient's current state.

While CAD has been discussed primarily as a mechanism for analyzing or reviewing the change data, in some embodiments CAD routines may also be used to detect and/or classify features in the imaged anatomy and/or to label a number of these features, such as anatomical features, in the datasets. In such embodiments, the CAD algorithm may first be applied to the volumetric datasets and the CAD output (or the features labeled by the CAD processing) may be registered, as discussed herein, and used as the basis for change comparison and so forth. For example, in some embodiments, a CAD algorithm may also be applied to one or more of the initial images or volumes to identify regions of interest to which the change detection processing is limited. In this manner, running CAD on one or more datasets allows attention or resources to be focused on a region of interest where the comparison/subtraction indicates significant changes. In such an implementation, other regions may be used for 'normalization' of the datasets, since for these "other" regions the comparison/ subtraction shows no significant change.

As noted above, the images to be compared may be two-dimensional or three-dimensional and may be acquired at the same or different times. For example, the present technique may be applied using a current 3D tomosynthesis image of the breast and one or more previously acquired 3D tomosynthesis images of the breast or 2D X-ray breast mammograms. The technique may also be applied in the situation where a patient undergoes a 3D tomosynthesis imaging of the breast for both the left and right breasts at same or different times. Similarly, the technique may be applied to other 3D images of other symmetrical volumes such as the left and right lung, kidney, or brain hemispheres.

Additionally, in certain embodiments, one or both of the first and second images 12 and 14, and possibly other images in the series, may also be generated using a multi-modality imaging system. In such cases a patient effectively undergoes two or more imaging exams from two or more modalities at the same time. For example, a mammography systems may be employed which concurrently performs X-ray tomographic imaging and ultrasound imaging. The X-ray tomographic and ultrasound images are acquired at substantially the same time with the patient hardly moving so the volumetric image datasets are substantially registered at the time of acquisition. When more than one scan is done in this way, the combination of image datasets may be used as a single volumetric image dataset where each location or pixel/voxel in the image dataset has a vector of values. The techniques for comparative image analysis, as described in various embodiments discussed above, may use multi-modality volumetric images such as this instead of single-modality scans. The registration may be done based on comparisons of certain elements of the vectors, or on combinations, or processed combinations of the vectors. Changes in the volumetric images may also be looked for in certain elements of the vectors, or on combinations, or processed combinations of the vectors, that may be different from those used for registration. CAD algorithms may be applied to certain elements of the vectors, or on combinations, or processed combinations of the vectors, that may be different from those used for registration or CACD.

It should be understood that the present technique may include more than just a one-to-one registration and/or comparison. For example, current bi-lateral datasets and bi-lateral datasets from previous acquisitions may be registered and compared. In this way, asymmetries in the current datasets can be identified and compared to asymmetries in prior datasets to evaluate their significance. For example, in one embodiment, all four datasets (i.e., current left and right images and prior left and right images) are registered, compared, and evaluated. In addition, the process may be extended to include image pairs acquired at other times, including images acquired using different modalities.

Furthermore, in one embodiment, the CAD processing is a combined CAD evaluation of e.g., current and registered datasets, and can take into account possible misregistrations. For example, in such an embodiment, misregistrations may be accounted for by identifying suspicious regions in the current dataset and searching in a neighborhood around the corresponding location in the registered dataset to see whether there was a prior indication or suggestion of the currently detected malignancy. In this way, growth rates and other change characteristics or metrics can be derived for tumors or other suspicious regions.

Figure 2:
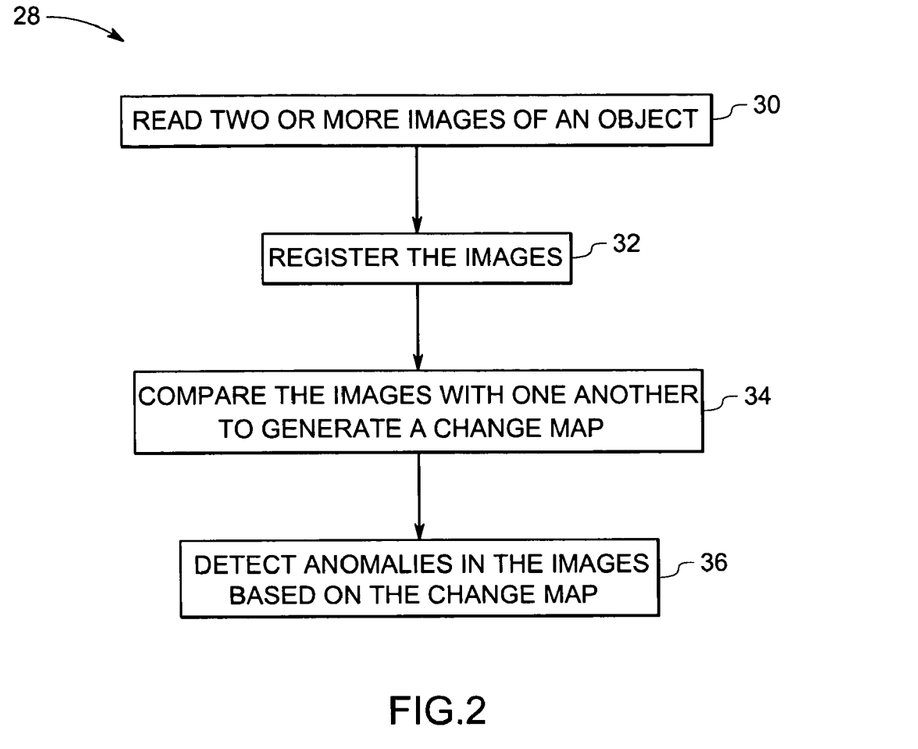
FIG. 2 is a flowchart illustrating an exemplary process for comparative image analysis and/or change detection in accordance with aspects of the present technique.

FIGS. 2-7 illustrate various flowcharts depicting processes for performing comparative image analysis and/or change detection using computer assisted detection and/or diagnosis (CAD) algorithms in accordance with different aspects of the present technique. For example, as illustrated in FIG. 2, an exemplary process 28 for comparative image analysis and/or change detection begins with reading two or more images of an object at step 30. The images are then registered at step 32 and compared with one another to generate a change map at step 34. The process further continues by detecting and locating anomalies in the images based on analysis of the change map at step 36.

Figure 3:
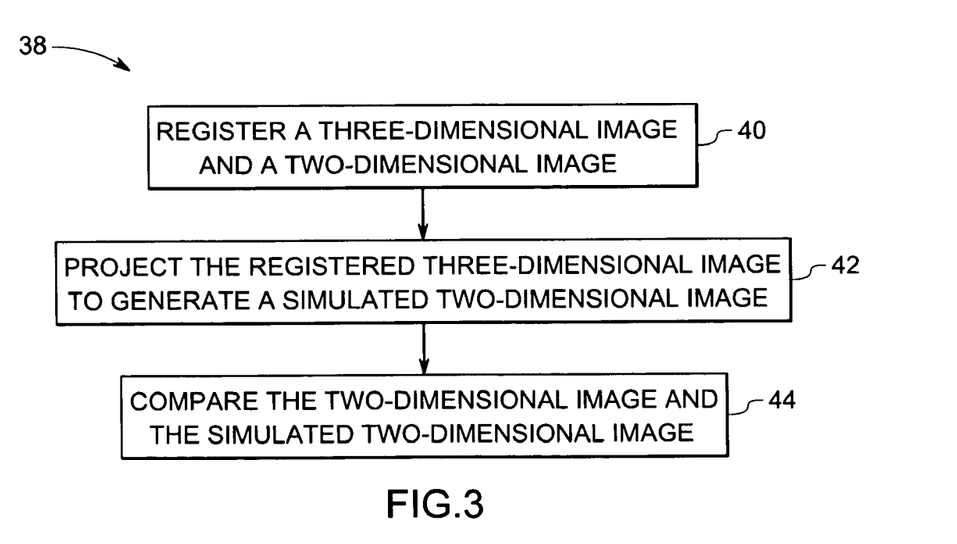
FIG. 3 is a flowchart illustrating a process for comparative image analysis between a two-dimensional image and a three-dimensional image in accordance with one aspect of the present technique.

In one embodiment of the present technique, FIG. 3 illustrates an exemplary process 38 for performing comparative image analysis when one of the images is a two-dimensional image while the other is a three-dimensional image. The process 38 registers the three-dimensional image and the two-dimensional image at step 40. The registration maps each point of the 3D image to a point in the 2D image, but each point in the 2D image maps to a set of points in the 3D image. The registered 3D image is then projected to generate a representative 2D image at step 42. Projecting the 3D image may further include normalizing or correcting to compensate for a reconstruction factor and/or a geometric factor. Further, it should be noted that, the 3D image and/or the 2D image may be normalized based on the imaging modality and/or the imaging technique employed for acquiring the image. The process 38 also includes comparing the 2D image and the reprojected or generated 2D image at step 44. It should be noted that, the process 38 may further generate a change map based on the comparison. As discussed above, such a change map may be analyzed to detect anomalies via a CAD algorithm.

Figure 4:
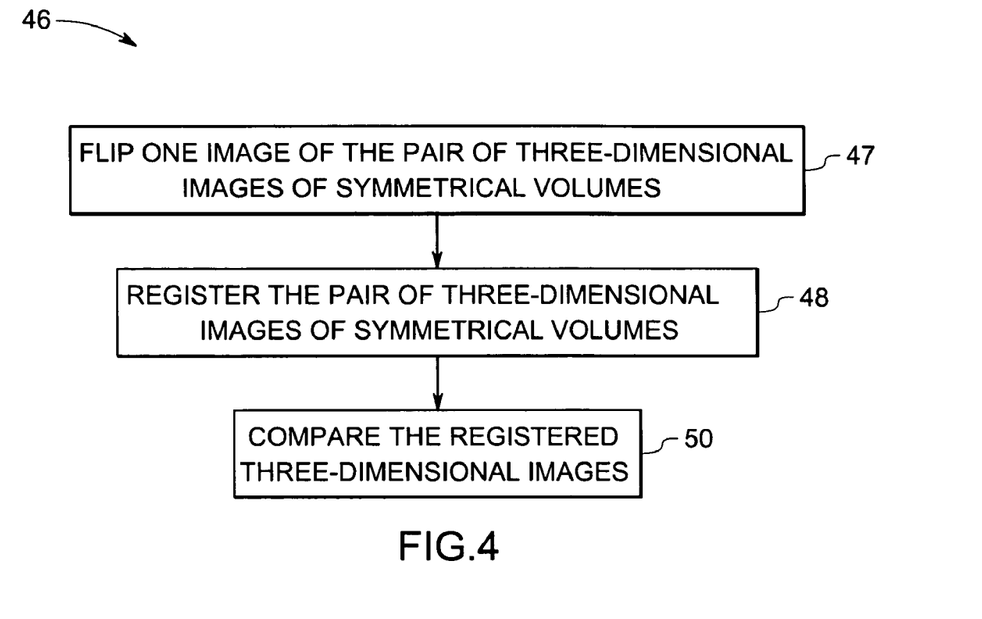
FIG. 4 is a flowchart illustrating a process for comparative image analysis between three-dimensional images of symmetrical volumes in accordance with one aspect of the present technique.

In another embodiment of the present technique, FIG. 4 illustrates exemplary process 46 for performing comparative image analysis between two or more 3D images of different symmetrical portions of a body or an object acquired at same time or different times. The different symmetrical portions or volume may include, but are not limited to, images of a left and right breast, images of a left and right kidney, images of a left and right lung, images of a left and right brain hemisphere, and so forth. The process 46 flips one image of the pair of 3D images of symmetrical volumes at step 47 such that the pair of symmetric images generally corresponds to one another. For example, for a pair of images of a left/right breast pair, the image of one of the breasts may be flipped about a vertical plane such that the flipped breast image can be aligned with the unflipped breast image. The 3D images of the symmetrical volumes are then registered at step 48. Further, the process compares the registered 3D images at step 50. The change map generated by the comparison may then be analyzed by a CAD algorithm to detect anomalies.

Figure 5:
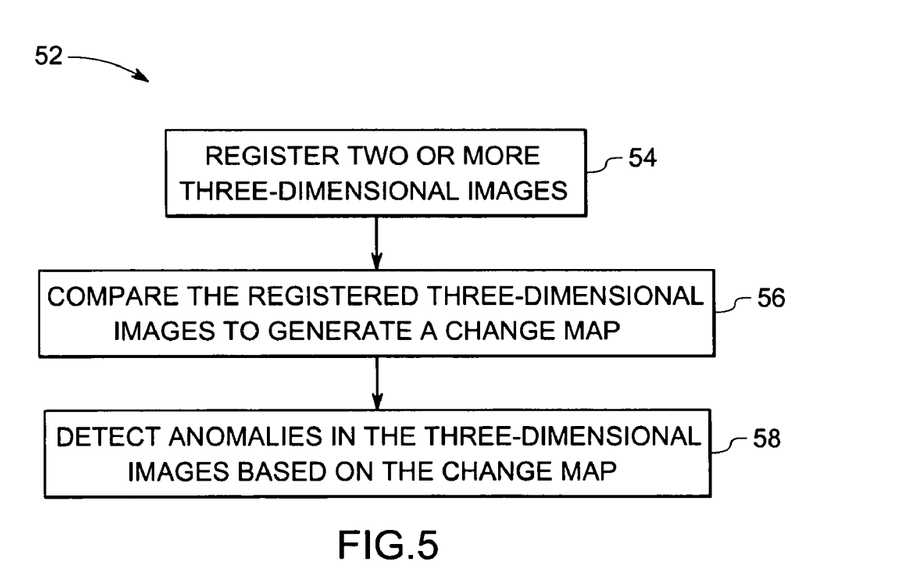
FIG. 5 is a flowchart illustrating a process for comparative image analysis between three-dimensional images in accordance with one aspect of the present technique.

Similarly, two or more three-dimensional images of a volume may be compared for analysis via exemplary process 52 illustrated in FIG. 5. The process 52 registers two or more 3D images at step 54. The process then compares the registered 3D images to generate the change map at step 56. The change map includes whatever differences may be present between the images. These differences indicate the changes that may have occurred over a period of time such as between the time when the first 3D image was acquired and when the second 3D image was acquired. The generated change map is then analyzed to detect anomalies in the image at step 58. The change map and/or the anomalies may be further fed to a master CAD algorithm for diagnosis and analysis.

Figure 6:
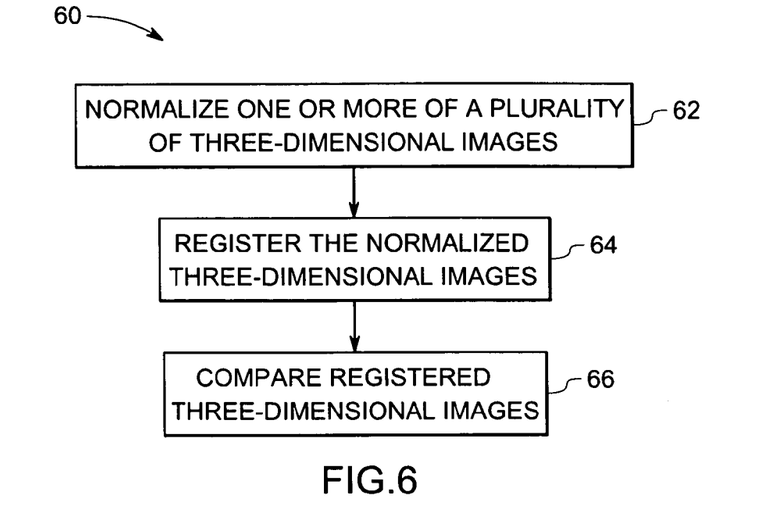
FIG. 6 is a flowchart illustrating another process for comparative image analysis between three-dimensional images in accordance with one aspect of the present technique.

As described above, in certain embodiments, the 3D images may be normalized based on the imaging modality and/or imaging technique associated with acquisition of each of the respective 3D images. For example, as illustrated in FIG. 6, the exemplary process 60 for comparative image analysis includes the normalization of one or more of a plurality of 3D images at step 62. The process 60 further includes registering the normalized 3D images at step 64 and comparing the registered 3D images at step 66 for analysis and diagnostic purpose.

Figure 7:
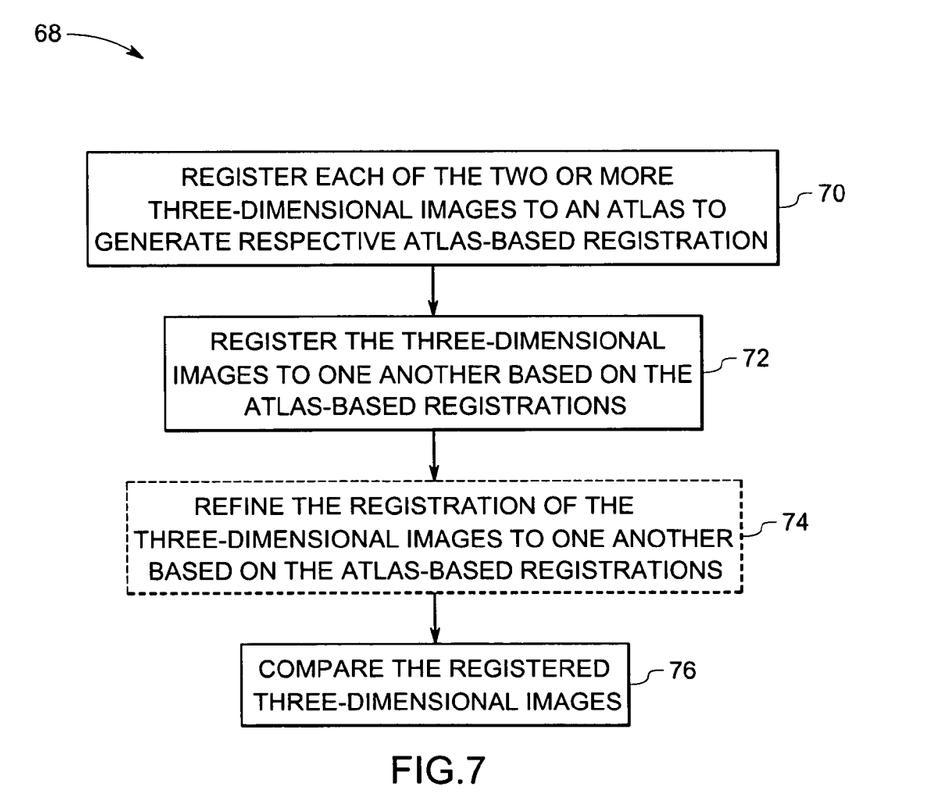
FIG. 7 is a flowchart illustrating another process for comparative image analysis between three-dimensional images in accordance with one aspect of the present technique.

Further, in certain embodiments, the registration may be performed via an atlas as described in exemplary process 68 illustrated in FIG. 7. The exemplary process 68 includes registering each of the two or more 3D images to an atlas to generate respective atlas-based registrations at step 70. The 3D images are then registered to one another at step 72 by establishing respective registration transfer functions between the 3D images based on the respective atlas-based registrations. It should be noted that, in some embodiments, registration between the 3D images may be further refined using the atlas-based registrations as a starting point at step 74. The process then continues by comparing the registered 3D images at step 76. Alternatively, each image may be compared directly against the atlas. As described above, a change map may be generated based upon the comparison that may be further analyzed via a CAD algorithm for detection of anomalies.

Figure 8:
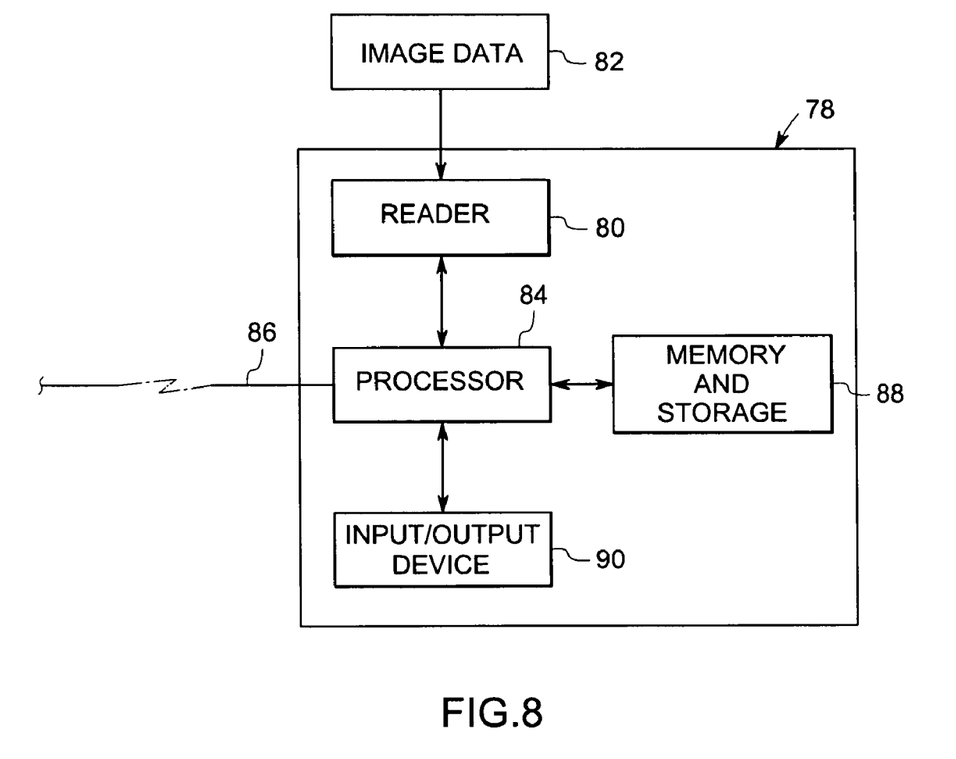
FIG. 8 illustrates an exemplary processor-based system for comparative image analysis in accordance with aspects of the present technique.

As will be appreciated by those of ordinary skill in the art, the techniques described above with reference to FIGS. 1-7 may be performed on a processor-based system, such as a suitable configured general-purpose computer or application specific computer. For example, FIG. 8 is a diagrammatic representation of an exemplary processor-based system 78 for performing the technique as explained with reference to FIGS. 1-7. The system 78 includes an interface coupled to the processor for receiving image data. In one embodiment, a reader 80 may be configured to read one or more images 82 acquired by one or more imaging modalities, as described above. In this embodiment, the reader 80 may include scanners, cameras or other special purpose image-reading device. Alternatively, in another embodiment the images may be provided to the system 78 and the processor 84 not by a reader but by a network or other communication connection 86 configured to access the image data from a remote location, such as a server or other storage device or a remote image reader or scanner. A memory and storage device 88 may be coupled to the processor 84 for storing the results of the analysis or for storing image data 82 for future analysis. Likewise, routines for performing the techniques described herein may be stored on the memory and storage device 88. The memory and storage device 88 may be integral to the processor 84, or may be partially or completely remote from the processor and may include local, magnetic or optical memory or other computer readable media, including optical disks, hard drives, flash memory storage, and so forth. Moreover, the memory and storage device 88 may be configured to receive raw, partially processed or fully processed data for analysis. An input/output device 90 may be coupled to the processor 84 to display the results of analysis, which may be in the form of graphical illustration, and/or to provide operator interaction with the processor 84, such as to initiate or configure an analysis. In one embodiment, the input device may include one or more of a conventional keyboard, a mouse, or other operator input device. The display/output device may typically include a computer monitor for displaying the operator selections, as well as for viewing the results of analysis according to aspects of the present technique.

Such devices may also include printers or other peripherals for reproducing hard copies of the results and analysis. It should be noted that, the one or more regions of interest may be displayed in an anatomical context with one or more visual indications of CAD determinations. In one embodiment, the processor 84 is configured to implement routines for performing some or all of the analytical procedures as described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method performed by a processor for comparative image analysis, the method comprising:
   receiving by the processor data representing two or more three dimensional images representing different imaging volumes;
   registering two or more three-dimensional images using the processor;
   automatically generating a change map comprising differences between the two or more three-dimensional images using the processor;
   automatically detecting anomalies in at least one of the two or more three-dimensional images based on the change map using the processor; and
   displaying the anomalies using a display device.

2. The method of claim 1, wherein automatically detecting comprises applying a CAD algorithm using the processor to one or more regions of interest identified based on characteristics of the change map.

3. The method of claim 1, comprising providing at least one of the change map, one or more regions of interest containing the one or more anomalies, or data representative of the identified anomalies using the processor as inputs to a master CAD algorithm.

4. The method of claim 1, wherein registering comprises establishing point correspondences between the two or more three-dimensional images using the processor.

5. The method of claim 1, wherein registering comprises registering the two or more three-dimensional images with one another via an atlas using data stored in a memory storage device.

6. The method of claim 1, wherein registering comprises flipping a first three-dimensional image relative to a second three-dimensional image using the processor when the first and the second three-dimensional images are generally symmetric to one another.

7. The method of claim 1, further comprising using the processor to normalize at least one of the two or more three-dimensional images based on at least one of an imaging modality or an imaging technique associated with acquisition of the respective three-dimensional images.

8. The method of claim 1, wherein automatically generating the change map comprises automatically comparing the two or more three-dimensional images using the processor.

9. The method of claim 1, wherein the two or more three-dimensional images are acquired at a same time or at different times by a same modality or by different modalities, and wherein some of the two or more three-dimensional images are generally symmetric to one another.

10. A computer readable storage medium for storing instructions which when executed by a processor performs the method, comprising:
    registering two or more three-dimensional images using the processor, wherein the two or more three-dimensional images represent different imaging volumes,
    generating a change map comprising differences between the two or more three-dimensional images using the processor;
    detecting anomalies in at least one of the three-dimensional images based on the change map using the processor; and
    displaying the anomalies using a display device.

11. The computer readable storage medium of claim 10 further comprising instructions which when executed, applies a CAD algorithm to one or more regions of interest identified based on characteristics of the change map.

* * * * *

UNITED STATES PATENT AND TRADEMARK OFFICE
CERTIFICATE OF CORRECTION

PATENT NO. : 7,653,263 B2  Page 1 of 1
APPLICATION NO. : 11/172655
DATED : January 26, 2010
INVENTOR(S) : Wheeler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this

Twenty-eighth Day of December, 2010

David J. Kappos
*Director of the United States Patent and Trademark Office*